April 12, 1927.
B. GERBER
1,624,786
DEVICE FOR CLEANING PIPE LINES
Filed May 1, 1924
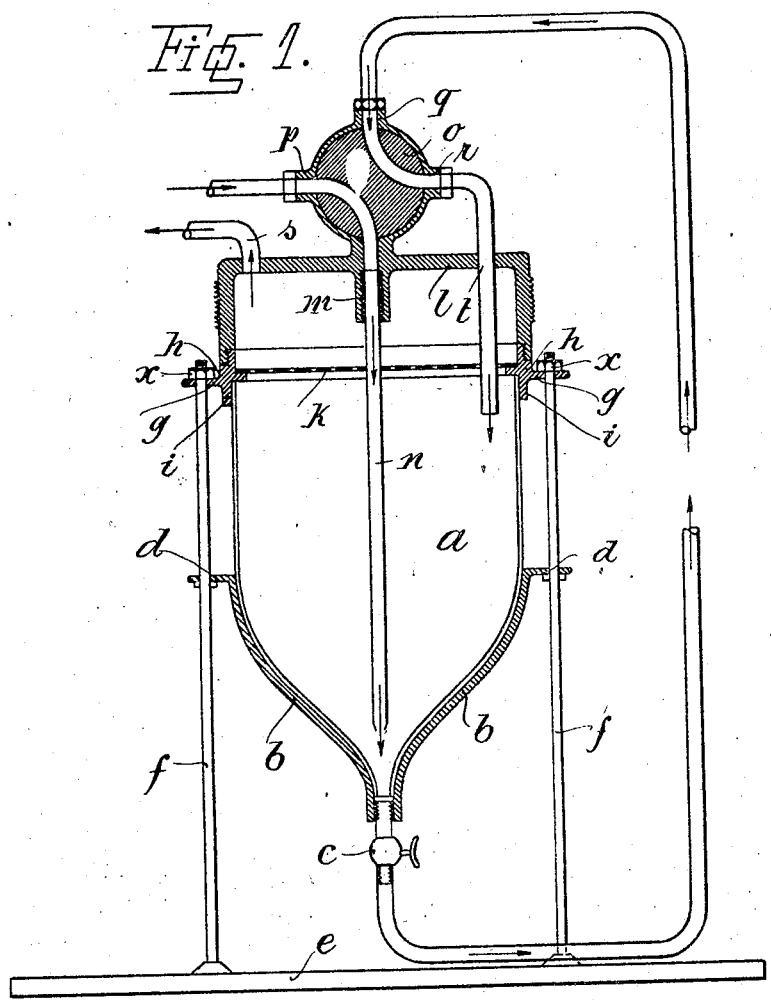
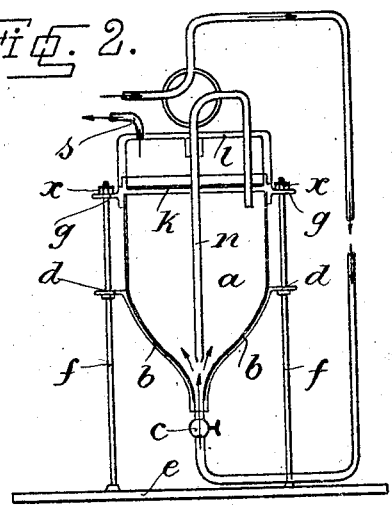
Inventor
B. Gerber
By Marks & Clerk Patented Apr. 12, 1927.

1,624,786

UNITED STATES PATENT OFFICE.

BERNHARD GERBER, OF STELLINGEN, NEAR HAMBURG, GERMANY.

DEVICE FOR CLEANING PIPE LINES.

Application filed May 1, 1924. Serial No. 710,414.

This invention relates to an apparatus for cleaning lines of piping, more particularly pipes for conveying beer, by means of a vessel containing a water-jet apparatus and a finely granulated cleaning material which is acted on by the suction of the water-jet device.

The invention consists more particularly in this, that on a closing cover of the vessel a two-way valve is provided, which communicates with the vessel and is provided with branches for connecting pipes, there being a further branch in the cover for the escape of the dirty flushing water, while in the lower end of the metal cap, in which the vessel rests, a valve is fixed, which is provided with a branch for the attachment of a connecting pipe and serves for closing the vessel.

In the accompanying drawing a constructional example of the invention is shown, in which Fig. 1 is a longitudinal section of the apparatus, partly in elevation, and Fig. 2 a diagrammatic view of the apparatus with the parts in the position for the return of the cleaning material.

The apparatus comprises a cylindrical glass vessel $a$, which is reduced in diameter at the bottom and serves for the reception of a finely granulated cleaning material and the lower part of which rests in a closely fitting metallic cap $b$, which can be closed at the bottom by a valve $c$. The upper edge of the metal cap $b$ is provided with lugs $d$, through which extend supporting members $f$ fixed to the base plate of the apparatus.

On the upper edge of the glass vessel $a$ rests a metal ring $h$ which is provided with lugs $g$ and an extension of which embraces the top of the glass vessel. The supporting members $f$ extend through the lugs $g$ and the latter are tightened up on them by means of nuts $x$, so that the glass vessel is held between the metal ring $h$ and the metal cap $b$. In the metal ring $h$ is a sieve $k$.

By a closing cover $l$ screwed on to the metal ring $h$ the glass vessel $a$ is tightly closed. On the inside of the closing cover $l$ is a branch $m$ with an internal thread, into which a water-jet pipe $n$ is screwed with a nozzle at its extremity. On the closing cover $l$ is a two-way valve $o$ communicating with the glass vessel. The two-way valve is provided with branches $p$, $q$, $r$ for the supply and return pipes. In the closing cover are provided an open outlet branch $s$ for the escape of the dirty flushing water and a pipe $t$.

The apparatus operates as follows:

After the line of piping to be cleaned has been connected to the flexible tubes connected to the branches $q$ and $c$, the two-way valve $o$ is so adjusted that the pipe $n$ is open to the supply of water. On water under pressure being admitted to the pipe $u$, it will pass through the two-way valve $o$ and the supply pipe $n$ and will emerge from the latter in the form of a strong jet, carrying along with it by suction cleaning material through the valve $c$ into the lines of piping to be cleaned and returning to the same through the return pipe and the two-way valve $o$ into the vessel $a$, the dirty flushing water being conveyed away through the open outlet branch $s$, while the cleaning material is kept in constant circulation.

When the line of piping has been cleaned or if the cleaning process is to be interrupted, the two-way valve $o$ is turned, so that the branches $p$ and $q$ are directly connected (Fig. 2), when the water will be conveyed through the two-way valve $o$ and the branch $q$ in the opposite direction to that previously described through the lines of piping to be cleaned, carrying the cleaning material remaining in the lines of piping with it and conveying it through the valve $c$ into the vessel $a$. The dirty flushing water will then flow off through the open outlet branch $s$, while the cleaning material will be deposited in the vessel.

What I claim is:—

1. An apparatus for cleaning pipe lines, more particularly pipes for conveying beer, by means of a finely granulated cleaning material acted upon the suction of a water-jet comprising in combination, a vessel, a jet comprising in combination, a vessel, a cover on said vessel, a two-way valve on said cover, a nozzle pipe in the vessel that is connected with the valve, branches on the valve for communicating with a water supply, the interior of the vessel and one of the pipes lines, an outlet pipe in the cover for conveying away the dirty water, a metal cap at the lower end of the vessel and a one way valve thereon for connecting up to the pipe to be cleaned, substantially as described.

2. An apparatus for cleaning pipes for conveying beverages, such as beer, comprising in combination a container for granulated cleansing material, said container having a cover and a converging bottom to form a funnel which is connected through a closure means with the pipe to be cleaned, said funnel having near its apex the nozzle of a water pressure pipe to form a suction jet for the cleansing material, said water pressure pipe being connected through the cover of the container with a two-way valve disposed upon the cover of the container, one way of said two-way valve connecting the jet with the pressure water supply when in one position, the other way being connected with a pipe protruding into the said container and by another branch with the pipe to be cleaned, while in an alternate position the two-way valve is adapted to connect the water supply pipe directly with the pipe to be cleaned for cleansing in the opposite direction, an outlet pipe being provided on the cover of the container for removing the flush water.

3. An apparatus for cleaning pipes for conveying beverages such as beer, comprising in combination a container for a granulated cleansing material, said container having cap-shaped cover and a cylindrical converging bottom to form a funnel which is connected by a valve to the pipe to be cleaned, said funnel having near its apex the nozzle of a water pressure supply pipe to form a suction jet for the cleansing material, said water pressure pipe being connected through the said cover of the container with a two-way valve disposed upon the cover of the container, the one-way of said two-way valve forming a connection between the jet and the pressure water supply, while the other way of said two-way valve forms a connection between a pipe protruding for a short distance into the container and the pipe to be cleaned, an outlet pipe provided on top of the cover of the container for removing the flush water, and a foraminous member fastened under the cap-shaped cover above the container to retain the granulated cleansing material, said member being penetrated by the said protruding pipe branch.

In testimony whereof I have signed my name to this specification.

BERNHARD GERBER.